(12) United States Patent
Tran et al.

(10) Patent No.: US 8,307,540 B1
(45) Date of Patent: Nov. 13, 2012

(54) METHOD FOR PROVIDING AN ENERGY ASSISTED MAGNETIC RECORDING (EAMR) TRANSDUCER

(75) Inventors: Ut Tran, San Jose, CA (US); Kevin K. Lin, San Ramon, CA (US); Yufeng Hu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 63 days.

(21) Appl. No.: 13/045,433

(22) Filed: Mar. 10, 2011

(51) Int. Cl.
G11B 5/127 (2006.01)
H04R 31/00 (2006.01)

(52) U.S. Cl. ............... 29/603.16; 29/603.07; 29/603.13; 29/603.14; 29/603.15; 29/603.18; 369/13.3; 369/13.29; 369/13.33; 219/209; 451/5; 451/41

(58) Field of Classification Search ............... 29/603.07, 29/603.11–603.16, 603.18; 216/209; 360/121, 360/122, 245.3, 317, 324; 369/13.29, 13.3, 369/13.33; 451/5, 41
See application file for complete search history.

(56) References Cited

U.S. PATENT DOCUMENTS

| | | | |
|---|---|---|---|
| 4,667,395 A | 5/1987 | Ahlgren et al. | |
| 5,994,747 A | 11/1999 | Wu | |
| 6,746,877 B1 | 6/2004 | Hornik et al. | |
| 6,795,630 B2 | 9/2004 | Challener et al. | |
| 7,272,079 B2 | 9/2007 | Challener | |
| 7,500,255 B2 | 3/2009 | Seigler et al. | |
| 8,024,748 B1 * | 9/2011 | Moravec et al. | 720/659 |
| 8,134,794 B1 * | 3/2012 | Wang | 360/59 |
| 8,164,855 B1 * | 4/2012 | Gibbons et al. | 360/125.74 |
| 2003/0137772 A1 | 7/2003 | Challener | |
| 2008/0068748 A1 | 3/2008 | Olson et al. | |
| 2010/0104768 A1 | 4/2010 | Xiao et al. | |
| 2010/0123965 A1 | 5/2010 | Lee et al. | |
| 2010/0123967 A1 | 5/2010 | Batra et al. | |
| 2010/0214685 A1 | 8/2010 | Seigler et al. | |

OTHER PUBLICATIONS

Zhongyan Wang, et al., "An approach for nanometer trench and hole formation", Optical Microlithography XXI, Proceedings of the SPIE, vol. 6924, pp. 692447-692447-8 (2008).

* cited by examiner

Primary Examiner — Paul D Kim

(57) ABSTRACT

A method provides an EAMR transducer. A sacrificial post is provided on an NFT distal from the ABS. This post has an edge proximate and substantially parallel to the ABS. A sacrificial mask is provided on the NFT between the post and the ABS. Optical material(s) are provided. The post is between the optical material(s) and the ABS. The post is removed. A heat sink post corresponding to the post is provided. The heat sink post has a bottom thermally coupled with the NFT and an edge proximate and substantially parallel to the ABS. Part of the heat sink post is removed, forming a heat sink having a top surface at an acute angle from the ABS. Nonmagnetic material(s) are provided on the optical material(s). A pole having a bottom surface thermally coupled with the heat sink and coil(s) are provided.

15 Claims, 14 Drawing Sheets

METHOD FOR PROVIDING AN ENERGY ASSISTED MAGNETIC RECORDING (EAMR) TRANSDUCER

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. At current high recording densities, performance of the EAMR transducer 10 may degrade. In particular, the NFT 22 may absorb a significant amount of heat during operation. As a result, the conventional NFT 22 may degrade. In some instances, the conventional NFT 22 may be destroyed during use. Consequently, a mechanism for dissipating heat without adversely affecting performance of the EAMR head may be desired.

Accordingly, what is needed is a system and method for improving performance and reliability of an EAMR transducer.

BRIEF SUMMARY OF THE INVENTION

A method and system for providing an energy assisted magnetic recording (EAMR) transducer coupled with a laser are described. The EAMR transducer has an air-bearing surface (ABS) configured to reside in proximity to a media during use and a near field transducer (NFT) proximate to the ABS. The NFT is for focusing the energy onto the region of the media. The method includes providing a sacrificial post on a first portion of the NFT distal from the ABS. The sacrificial post has a first edge proximate and substantially parallel to the ABS. The method and system also include providing a sacrificial mask on a second portion of the NFT between the sacrificial post and the ABS and providing optical material(s) adjacent to the sacrificial post. The sacrificial post is between the optical material(s) and the ABS. The method further includes removing the sacrificial post and then providing a heat sink post corresponding to the sacrificial post. The heat sink post has a bottom and the first edge proximate and substantially parallel to the ABS. The bottom of the heat sink post is thermally coupled with the NFT. The method also includes removing a portion of at least the heat sink post to provide a heat sink having a bottom thermally coupled with the NFT and a top surface at an angle with respect to the ABS. The angle is greater than zero and less than ninety degrees. Nonmagnetic material(s) are provided on at least the optical material(s). The nonmagnetic material(s) have a top surface at a second angle with respect to the ABS. A write pole configured to write to a region of the media is provided. The write pole has a bottom surface. A portion of the bottom surface is thermally coupled with the top surface of the heat sink. At least one coil for energizing the write pole is also provided.

DETAILED DESCRIPTION OF THE EMBODIMENTS OF THE INVENTION

Figure 1:
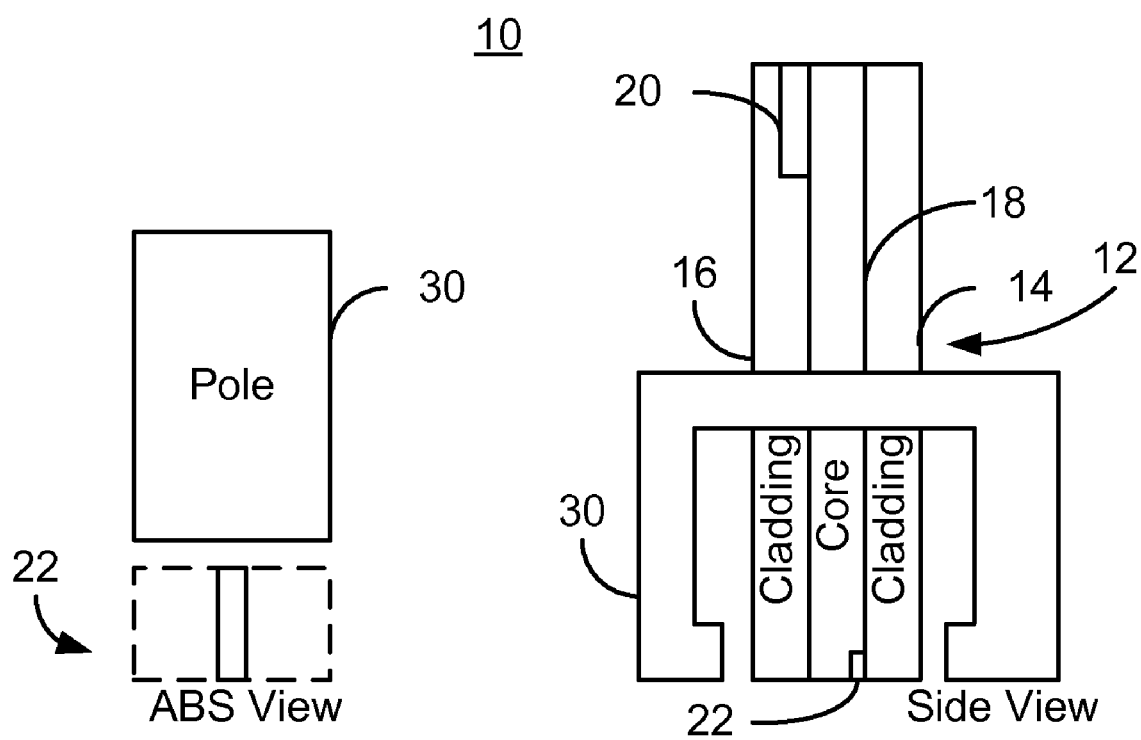
FIG. 1 is a diagram depicting a conventional EAMR transducer.
Figure 2:
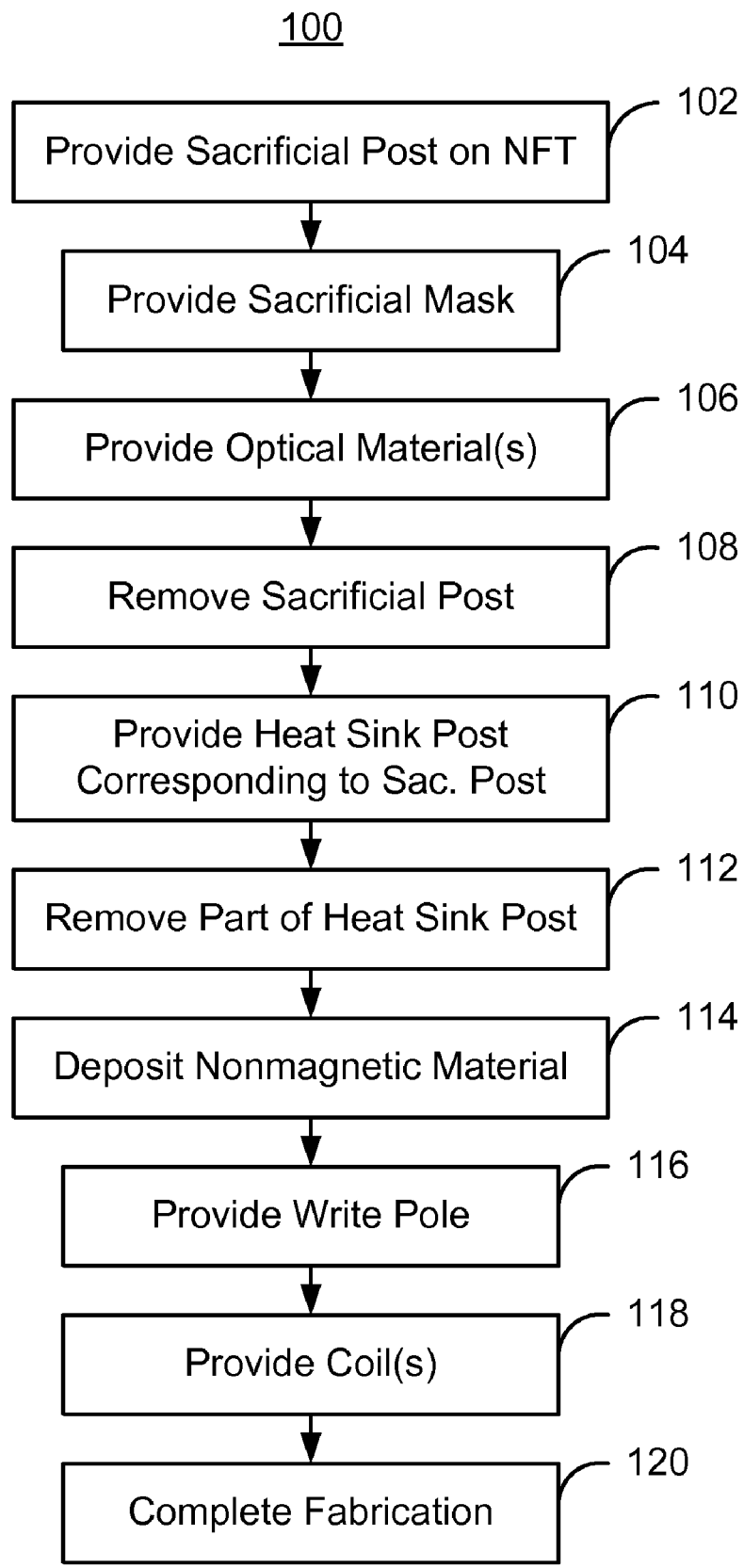
FIG. 2 is a flow chart depicting an exemplary embodiment of a method for fabricating an EAMR transducer including a heat sink.

FIG. 2 is a flow chart depicting an exemplary embodiment of a method 100 for fabricating an EAMR transducer having a heat sink. For simplicity, some steps may be omitted and/or combined. The EAMR transducer being fabricated may be part of a merged head that also includes a read head (not shown) and resides on a slider (not shown) in a disk drive. The method 100 is also described in the context of providing a single EAMR transducer. However, the method 100 may be used to fabricate multiple transducers at substantially the same time. The method 100 and system are also described in the context of particular layers. However, in some embodiments, such layers may include multiple sub-layers. The method 100 also may commence after formation of other portions of the EAMR transducer. In one embodiment, the method 100 commences after formation of the NFT and an optical dielectric surrounding the sides of the NFT. In some embodiments, therefore, a flat surface for formation of subsequent structures has been provided. The NFT may also have a disk portion and a pin portion between the disk and the ABS.

A sacrificial post, or sacrificial chimney, is provided on a first portion of the NFT distal from the ABS, via step 102. The sacrificial post may include materials such as SiC, amorphous carbon, and aluminum oxide. The sacrificial post resides on the disk portion of the NFT. The sacrificial post has a first edge proximate to the ABS. This first edge is also substantially parallel to the ABS. Thus, the first edge is substantially planar. In some embodiments, the sacrificial post may have a similar shape as the disk portion of the NFT. For example, in some embodiments the disk portion of the NFT has a circular footprint, otherwise termed a cross-sectional shape. In such embodiments, the sacrificial post may have a "D"-shaped footprint, or cross-sectional shape. Further, the sacrificial post may be smaller than the NFT. In other embodiments, the sacrificial post may be substantially the same size as the NFT.

A sacrificial mask is provided on a second portion of the NFT between the sacrificial post and the ABS, via step 104. The sacrificial mask is removable via a reactive ion etch (RIE) or wet etch. For example, the sacrificial mask might include materials such as NiFe, FeCr, Ru, aluminum oxide or other metal. Thus, when desired, the sacrificial mask may be completely removed from the NFT.

Optical material(s) are provided adjacent to the sacrificial post, via step 106. The sacrificial post is between the optical material(s) and the ABS. Thus, the sacrificial post is also between the optical material(s) and the sacrificial mask. The optical material may include aluminum oxide and/or other lower index of refraction material. Step 106 may include depositing the optical material(s) and performing a chemical mechanical polish (CMP). The CMP ensures that the top of the sacrificial post is exposed.

The sacrificial post is removed, via step 108. Step 108 includes performing an etch that is appropriate to the material used for the sacrificial post. In addition, the etch is desired to leave the underlying NFT substantially undamaged. Thus, the selectivity of the etch for the material used in the sacrificial post is generally desired to be high. For example, in some embodiments, an $SF_6$ etch may be used for a silicon carbide sacrificial post. Other etches may be used for other materials.

A heat sink post corresponding to the sacrificial post is provided, via step 110. Thus, the heat sink post occupies the region in which the sacrificial post was previously located and includes high thermal conductivity materials such as Au and/or Cu. The heat sink post has a bottom thermally coupled with the NFT. In some embodiments, the bottom of the heat sink is in direct physical contact with the NFT. Step 110 may include depositing the material for the heat sink post, then planarizing the transducer. Because the heat sink post takes the place of the sacrificial post, the heat sink post has a first edge corresponding to the first edge of the sacrificial post. Thus, the heat sink post includes a first edge proximate and substantially parallel to the ABS. In some embodiments, therefore, the heat sink post may have a "D"-shape.

A portion of at least the heat sink post is removed at an angle from the ABS, via step 112. In some embodiments, step 112, includes providing a mask distal from the ABS and milling the transducer at a milling angle. In addition to a portion of the heat sink mask post being removed, a portion of the optical material(s) and/or the sacrificial mask may be removed. Thus, a heat sink is provided. The heat sink has a bottom thermally coupled with the NFT and a top surface at an angle with respect to the ABS. This angle is greater than zero and less than ninety degrees. Stated differently, the top surface of the heat sink forms an acute angle with the ABS.

At least one nonmagnetic material is provided on at least the optical material(s), via step 114. In some embodiments, a portion of the heat sink may be covered by the nonmagnetic material(s). However, in such an embodiment, a significant portion of the heat sink's top surface is still desired to be exposed. Further, the nonmagnetic material(s) provided may also be optical material(s), such as aluminum oxide. Therefore, the nonmagnetic materials provided in step 114 may thicken the top cladding layer of the waveguide. Thus, step 114 may include providing a mask covering the heat sink prior to deposition of the nonmagnetic material(s). The nonmagnetic material(s) have a top surface at a second angle with respect to the ABS. In some embodiments, this angle may be the same as the angle made by the top surface of the heat sink. In other embodiments, the second angle may be different. Further, the angle of the nonmagnetic material(s) may vary throughout its top surface.

A write pole configured to write to a region of the media is provided, via step 116. A portion of the bottom surface of the write pole is thermally coupled with the top surface of the heat sink. At least one coil for energizing the write pole is also provided, via step 118. Fabrication of the EAMR transducer may then be completed, via step 120.

Figure 3:
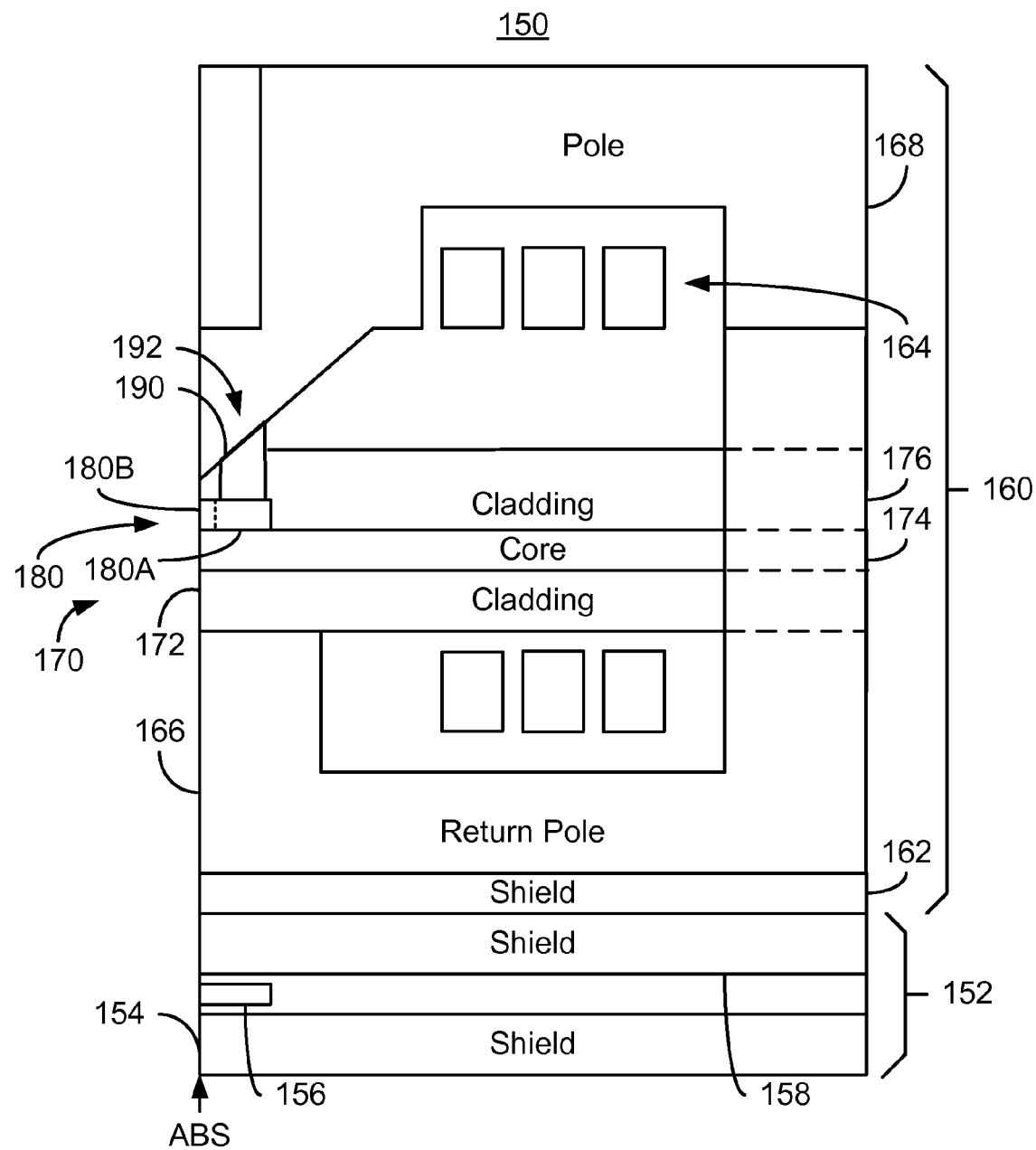
FIG. 3 is a diagram depicting an exemplary embodiment of an EAMR head.

Thus, an EAMR transducer including a heat sink thermally coupling the NFT and the pole may be provided. Further, the pole may have a sloped bottom surface. For example, FIG. 3 depicts one embodiment of an EAMR head 150 fabricated using the method 100. For clarity, FIG. 3 is not to scale. For simplicity not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 160 includes waveguide 170, NFT 180, write pole 168, return pole 166, coil(s) 164, and shield 162. The EAMR transducer 160 may also include a grating (not shown) that is used to couple light from the laser (not shown) to the waveguide 170. The coil(s) 164 may be used to energize the write pole 140 during writing. In the embodiment shown, the shield 162 is depicted as separate from the return pole 166. However, in another embodiment, these components may be combined. Further, the waveguide 170 is shown as residing between the pole 168 and return pole 166. In another embodiment, the pole 168 may be between the waveguide and the return pole 166.

The waveguide 170 directs energy from the laser to the ABS and more specifically to the NFT 180. The waveguide 170 includes cladding 172 and 176 as well as core 174. The NFT 180 is optically coupled with the waveguide 170, receiving energy from the core 174. The NFT 180 is proximate to the ABS. For example, the NFT 180 is shown as having a surface occupying a portion of the ABS. The NFT 180 focuses energy from the waveguide 170 onto a region of the media (not shown). In some embodiments, the NFT 180 includes a disk 180A and a pin 180B. The pin 180B is between the disk 180A and the ABS. Thus, the disk 180A is recessed from the ABS and thus is shown by a dashed line in the ABS view of FIG. 3. The disk 180A extends further in the track width direction (perpendicular to the plane of the page in FIG. 3) than the pin 180B. Although termed a disk, the disk 180A of the NFT 180 need not be disk-shaped. For example, instead of having a circular cross-sectional shape, the disk 180A may be square, rectangular, or have another shape.

The write pole 168 is configured to write to the region of the media heated by the NFT 180. In the embodiment shown, no portion of the bottom surface of the pole 168 proximate to the ABS is parallel to the top surface of the NFT 180. In some embodiments, this portion of the bottom surface of the pole 168 may be parallel to the top surface of the NFT. In the embodiment shown, the entire portion of the bottom surface of the pole 168 slopes away from the NFT 180.

The heat sink 190 is thermally coupled at its bottom with the NFT 180 and at its top with the bottom surface of the pole 168. The heat sink 190 has a top surface 192 that is sloped. The heat sink 190 also has a front edge 193 that is parallel to the ABS. In general, the width of the heat sink is smaller than that of the NFT 180.

Using the method 100, the heat sink 190 can be provided in the EAMR transducer 150. The heat sink 190 allows for heat to be carried away from the NFT 180. The method 100 also provides the heat sink 190 without damaging the NFT 180. Consequently, performance of the NFT 180 may be improved. Because the heat sink 180 and thus the pole 190 are sloped, a separation between the magnetic and optical components may be maintained. Thus, performance of the EAMR transducer 150 may be enhanced.

Figure 4:
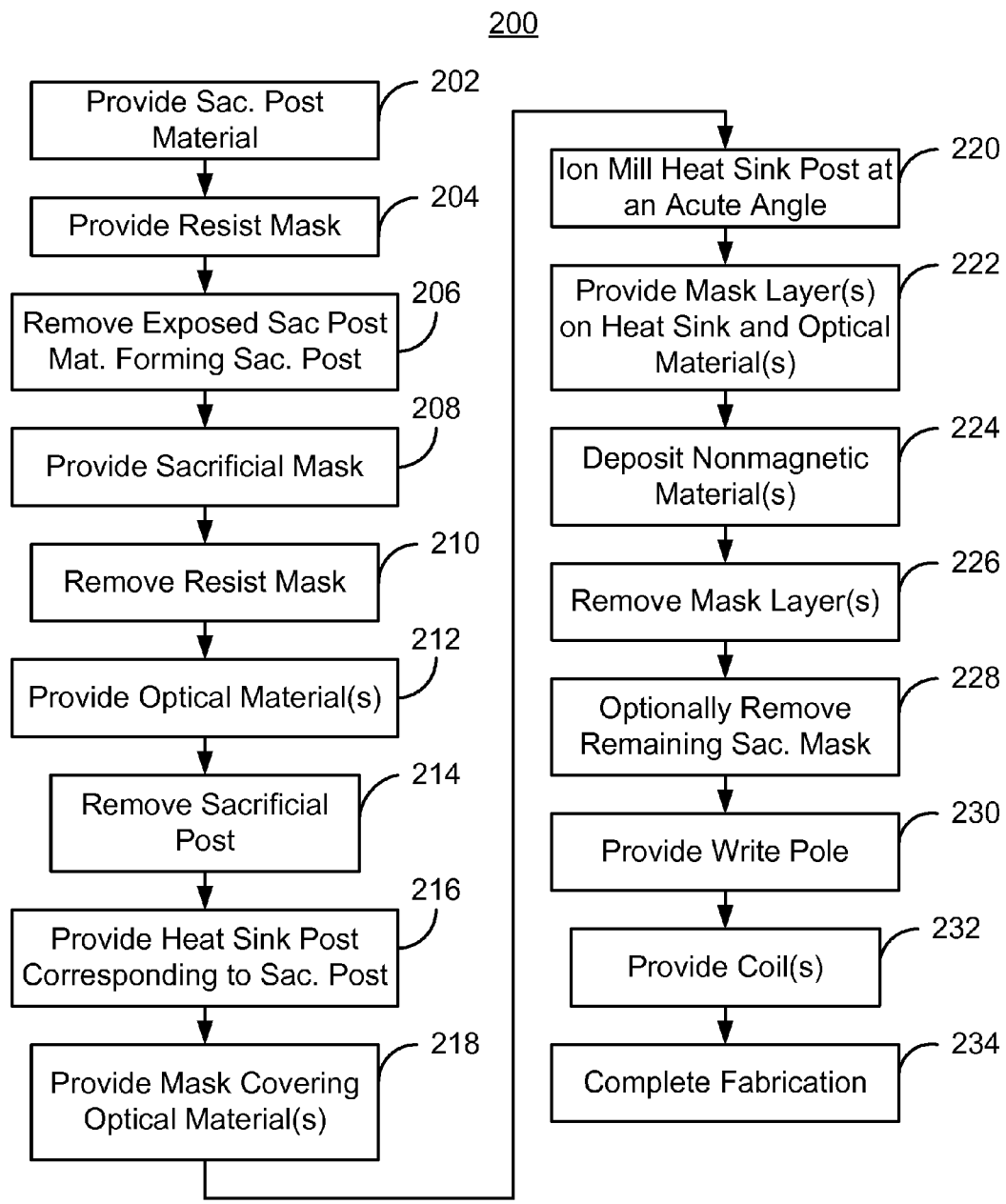
FIG. 4 is a flow chart depicting an exemplary embodiment of a method for providing a heat sink in an EAMR transducer.

FIG. 4 is a flow chart depicting another exemplary embodiment of a method 200 for fabricating an EAMR transducer. For simplicity, some steps may be omitted, combined and/or interleaved. FIGS. 5-16 are diagrams depicting side and top views of an exemplary embodiment of a portion of an EAMR transducer during 250 fabrication. For clarity, FIGS. 5-16 are not to scale. Further, although FIGS. 5-16 depict the ABS location (location at which the ABS is to be formed), other embodiments may have other locations for the ABS. Referring to FIGS. 4-16, the method 200 is described in the context of the EAMR transducer 250. However, the method 200 may be used to form another device (not shown). The EAMR transducer 250 being fabricated may be part of a merged head that also includes a read head (not shown in FIGS. 5-16), a laser (not shown in FIGS. 5-16) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. For example, an NFT and portion of the cladding layer have already been fabricated. The method 200 is also described in the context of providing a single EAMR transducer 250. However, the method 200 may be used to fabricate multiple transducers at substantially the same time. The method 200 and device 250 are also described in the context of particular layers. However, in some embodiments, such layers may include multiple sublayers.

Figure 5:
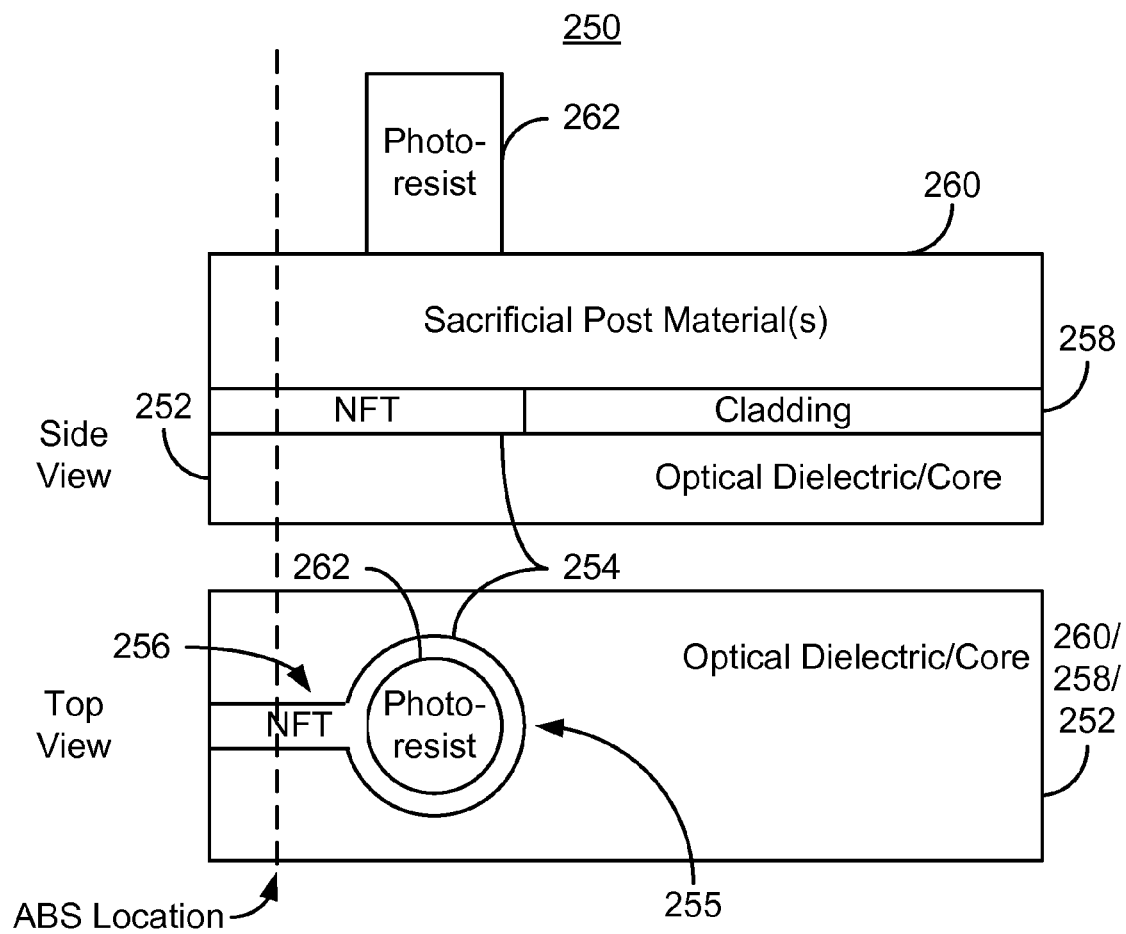
FIGS. 5-16 are diagrams depicting an exemplary embodiment of a magnetic recording transducer during fabrication.
Figure 6:
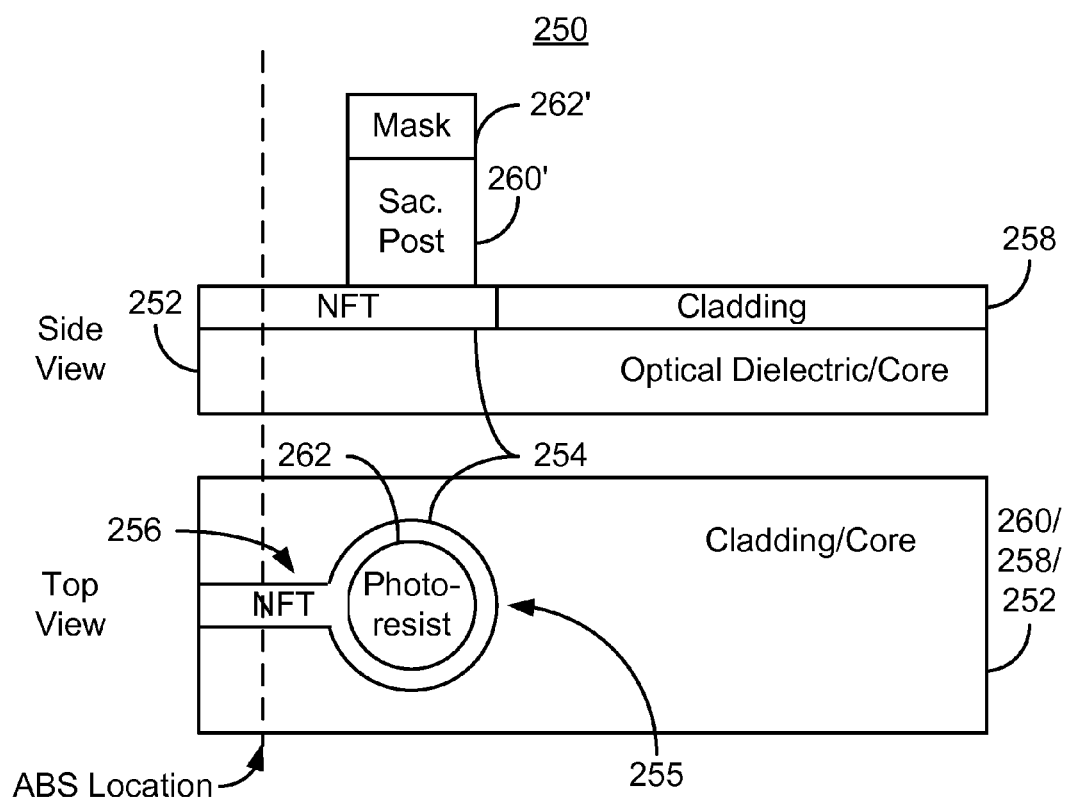

Layers of the material(s) for the sacrificial post are provided on the NFT, via step 202. Step 202 may include depositing a layer of material(s) such as SiC, amorphous carbon, and/or alumina and providing a mask for defining a disk from the sacrificial materials. In some embodiments, a layer of photoresist is spin coated and photolithography used to provide a mask. FIG. 5 depicts the EAMR transducer 250 after this portion of step 202 is performed. Thus, optical dielectric/core 252 and NFT 254 are shown. The NFT includes a disk portion 255 and a pin portion 256. Also depicted are cladding 258 and sacrificial post materials 260. Photoresist post 262 is formed above the disk portion 255 of the NFT 254. In some embodiments, the photoresist post 262 is cylindrical and has a width that is somewhat smaller than the disk portion 255 of the NFT 254. However, in other embodiments, other widths and shapes may be used. The layer sacrificial material exposed by the photoresist mask is removed. This may include performing a reactive ion etch configured to remove the sacrificial materials 260, but not the underlying NFT 254. FIG. 6 depicts the EAMR transducer 250 after this portion of step 202 is performed. Thus, a disk of sacrificial material(s) 260' is shown. Note that some of the mask 262 may be consumed, leaving mask 262'. This mask may then be removed. The disk of sacrificial material(s) 260' has substantially the same cross-sectional shape as the underlying disk portion 255 of the NFT 254.

Figure 7:
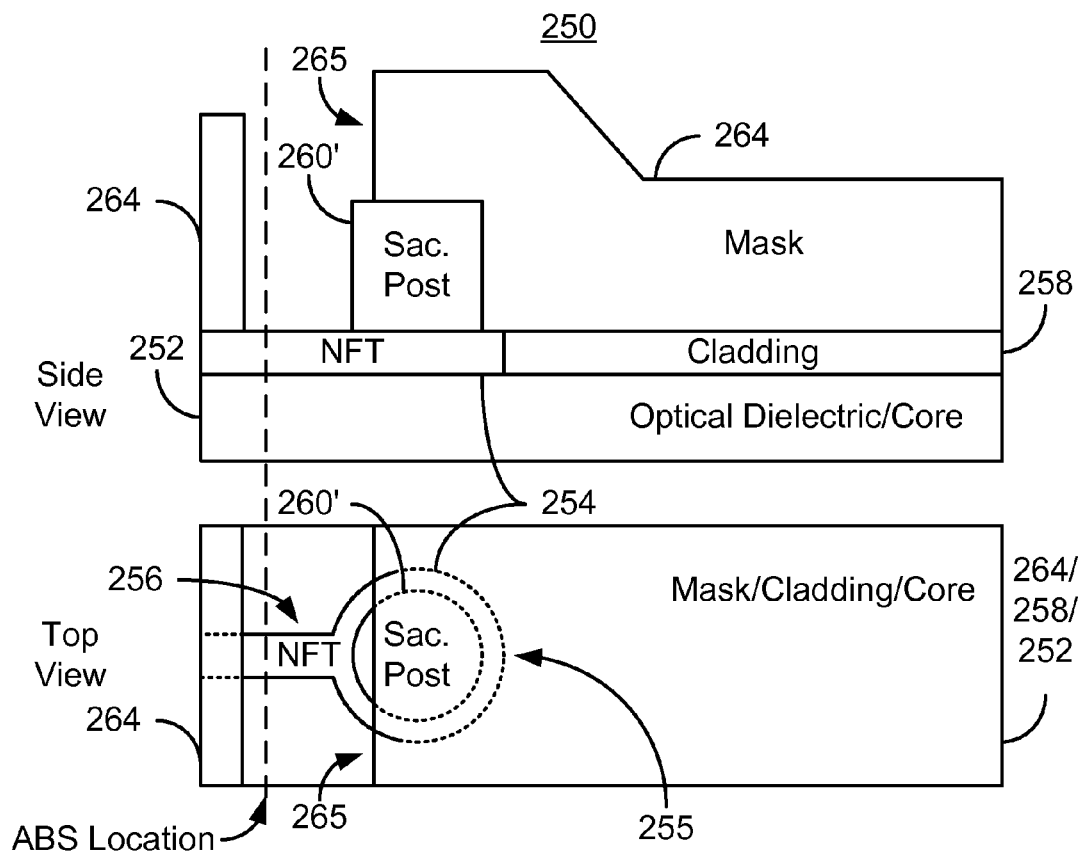

A sacrificial post mask may then be provided, via step 204. The sacrificial post mask may be a photoresist mask, such as PMGI. The photoresist mask covers a portion of the sacrificial material(s) 260' and has a front edge. A portion of the resist mask may also cover other regions. FIG. 7 depicts the EAMR transducer 250 after step 204 is performed. Thus, the resist mask 264 is shown. The resist mask 264 has front edge 265.

An exposed portion of the sacrificial post material(s) is removed to provide a sacrificial post, via step 206. Again, an RIE might be used in step 206. The RIE removes the sacrificial post material(s), but not the underlying NFT 254. Thus, a sacrificial post may be provided. The sacrificial post has a first edge corresponding to the front edge 265 of the sacrificial post mask 264.

Figure 8:
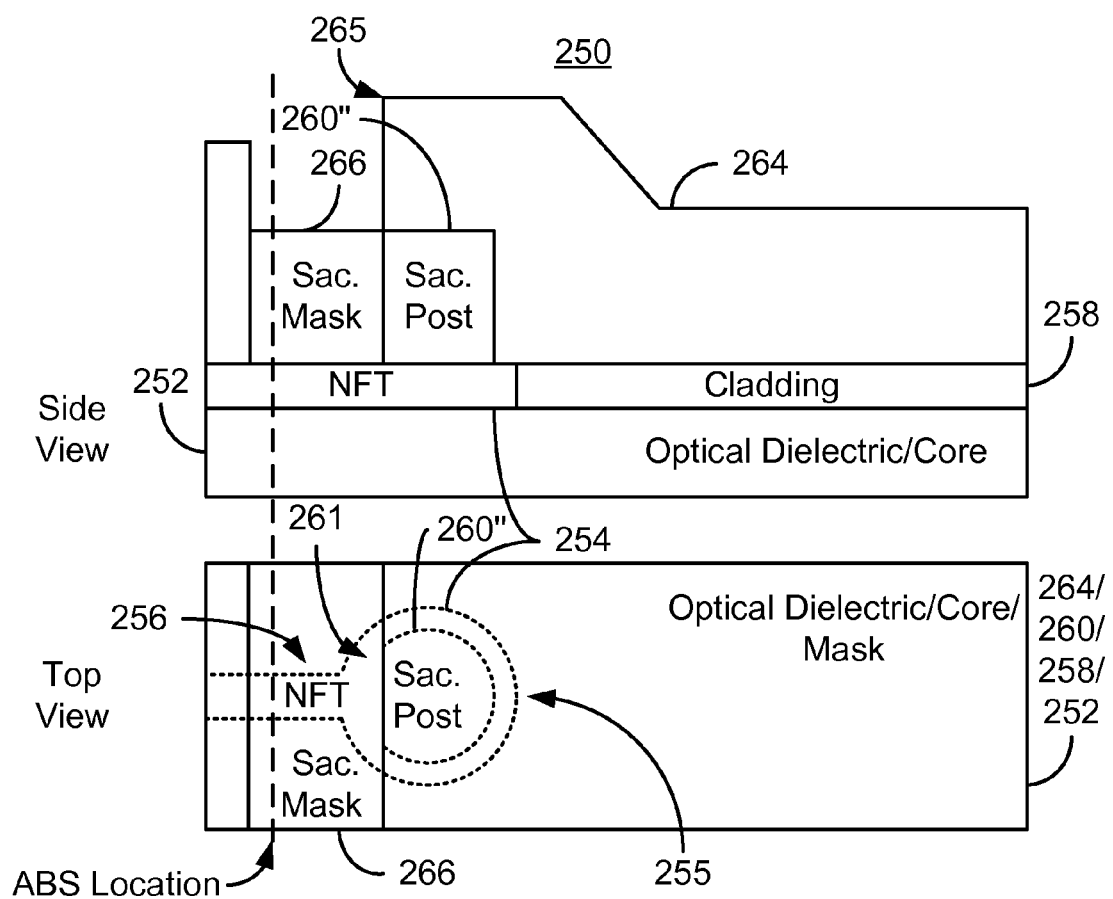

A sacrificial mask is provided on a second portion of the NFT 254 between the sacrificial post and the ABS, via step 208. Step 208 includes depositing material(s) such as NiFe, FeCr, Ru, alumina, and/or other metals or materials. FIG. 8 depicts the transducer 250 after step 208 is performed. Thus, sacrificial post 260" having a front edge 261 is shown. Also depicted is sacrificial mask 266. Although shown as having the same height as the sacrificial post 260", the sacrificial mask 266 may have another height.

Figure 9:
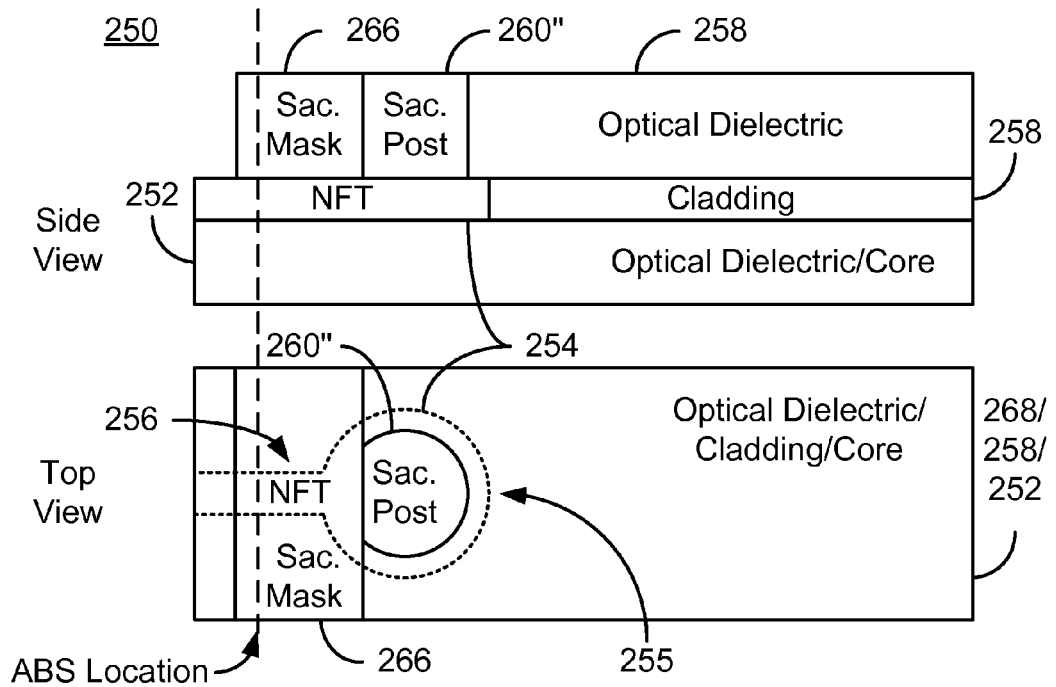
Figure 10:
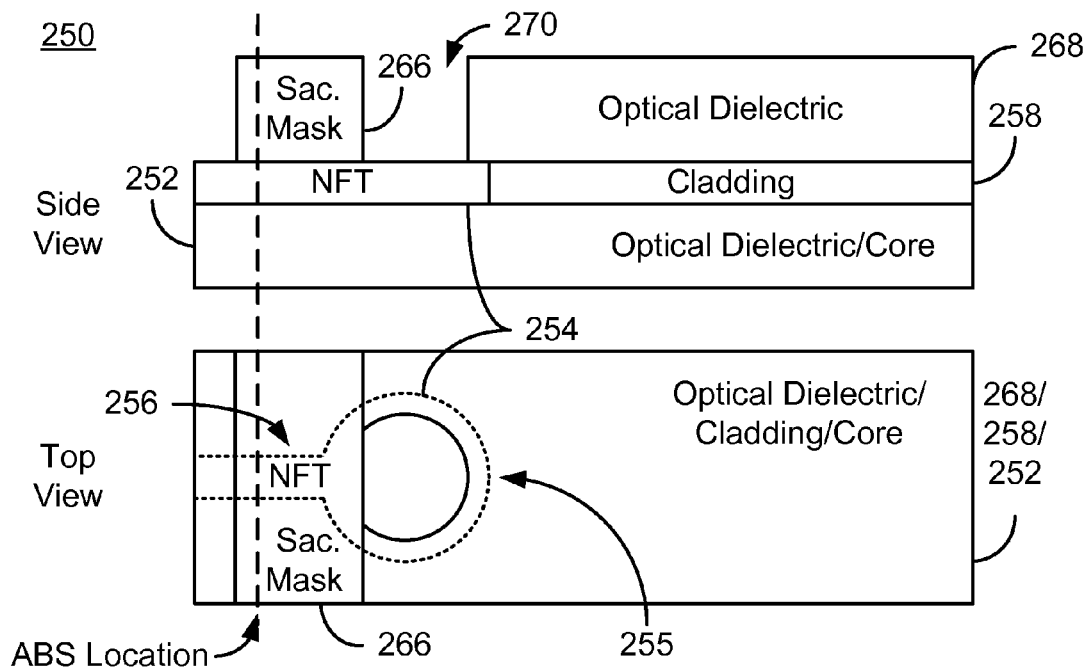

The resist mask 264 may be removed, via step 210. Optical material(s) are provided adjacent to the sacrificial post, via step 212. These optical material(s) may form part of the cladding of the waveguide. FIG. 9 depicts the EAMR transducer 250 after step 212 is performed. Thus, sacrificial post 260" having a front edge is between the optical material(s) 266 and the ABS. Step 210 may include blanket depositing the optical layer, then performing a CMP. The sacrificial post 260" may then be removed, via step 214. Step 214 may be accomplished using a dry or wet etch that removes the sacrificial post 260", but leaves the NFT 254 substantially undamaged. FIG. 10 depicts the transducer after step 214 is performed. Thus, trench 270 has been formed.

Figure 11:
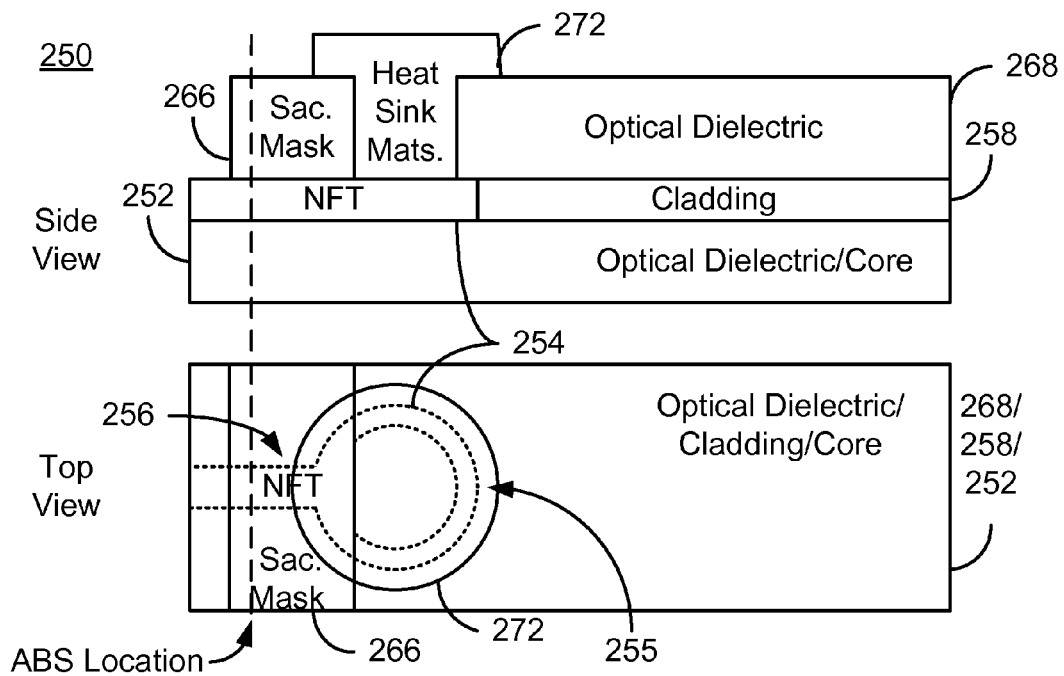
Figure 12:
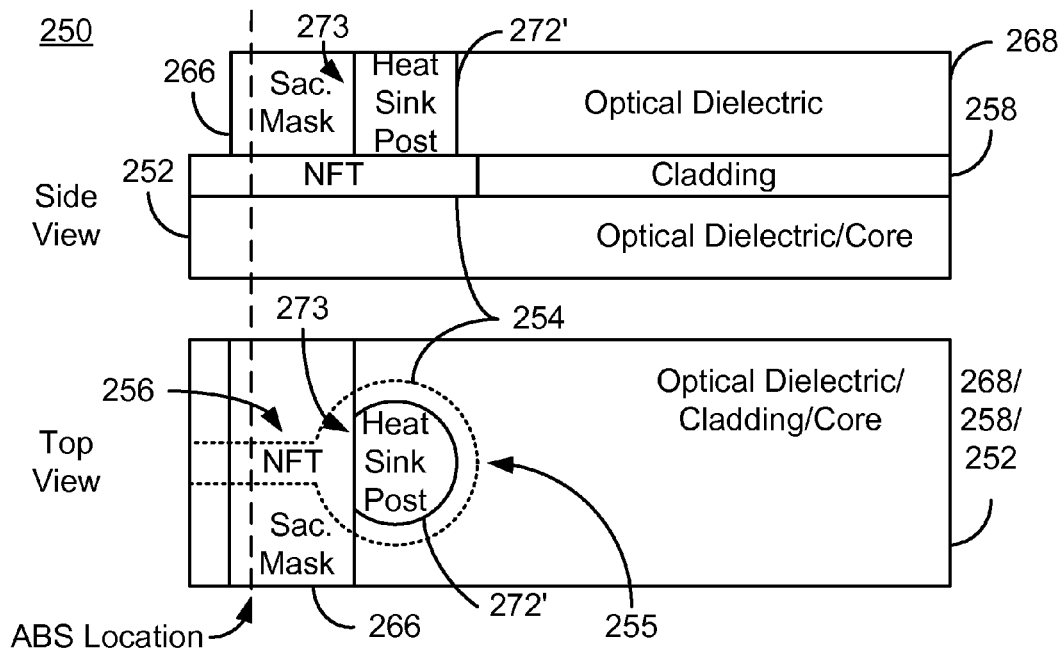

A heat sink post corresponding to the sacrificial post 260" is provided, via step 216. Stated differently, step 216 provides the heat sink post in the location 270 vacated by the sacrificial post 260". Step 216 includes depositing the materials for the heat sink. These materials may include high thermal conductivity materials such as Au and/or Cu. In other embodiments, other high thermal conductivity material(s), including those other than metals, may be used. FIG. 11 depicts the EAMR transducer after this portion of step 216 is performed. Thus, heat sink material(s) 272 are shown. A CMP or other planarization may then be performed. FIG. 12 depicts the EAMR transducer 250 after step 216 is performed. Thus, a heat sink post 272' is formed. The bottom of the heat sink post 272' is thermally coupled with the NFT 254. The heat sink post 272' also has a first edge 273 corresponding to the first edge 261 of the sacrificial post. Thus, the first edge 273 is proximate and substantially parallel to the ABS.

Figure 13:
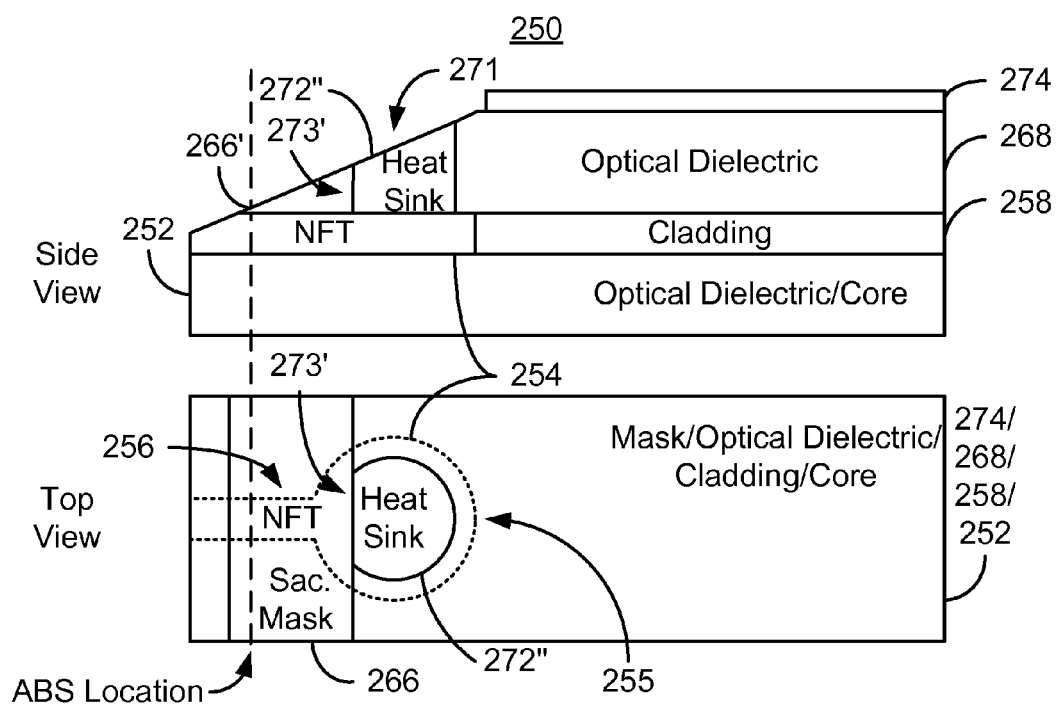

A mask covering at least a portion of the optical material(s) 268 is provided, via step 218. In some embodiments, a hard mask such as thin metal mask is provided. For example, materials such as Ru and/or Cr might be used. Alternatively, other mask materials might be used. The transducer is then ion milled at a milling angle, via step 220. This milling angle corresponds to the angle desired for the top surface of the heat sink. For example, in some embodiments, the milling angle is at least twenty and not more than fifty degrees. In other embodiments, the desired milling angle is at least twenty and not more than forty-five degrees. In some embodiments, the taper angle is at least twenty-seven and not more than thirty-three degrees. In other embodiments, other milling and taper angles may be used. FIG. 13 depicts the EAMR transducer 250 after step 218 is performed. Thus, thin metal mask 274 is shown. The heat sink 272" having top surface 271 and front edge 273' is shown. As can be seen in FIG. 13, the top surface 271 forms an angle that is greater than zero and less than ninety degrees with the ABS. The bottom of the heat sink 272" is thermally coupled with the disk portion 255 of the NFT 254. More specifically, the bottom 272" of the heat sink is in direct physical contact with the NFT 254.

Figure 14:
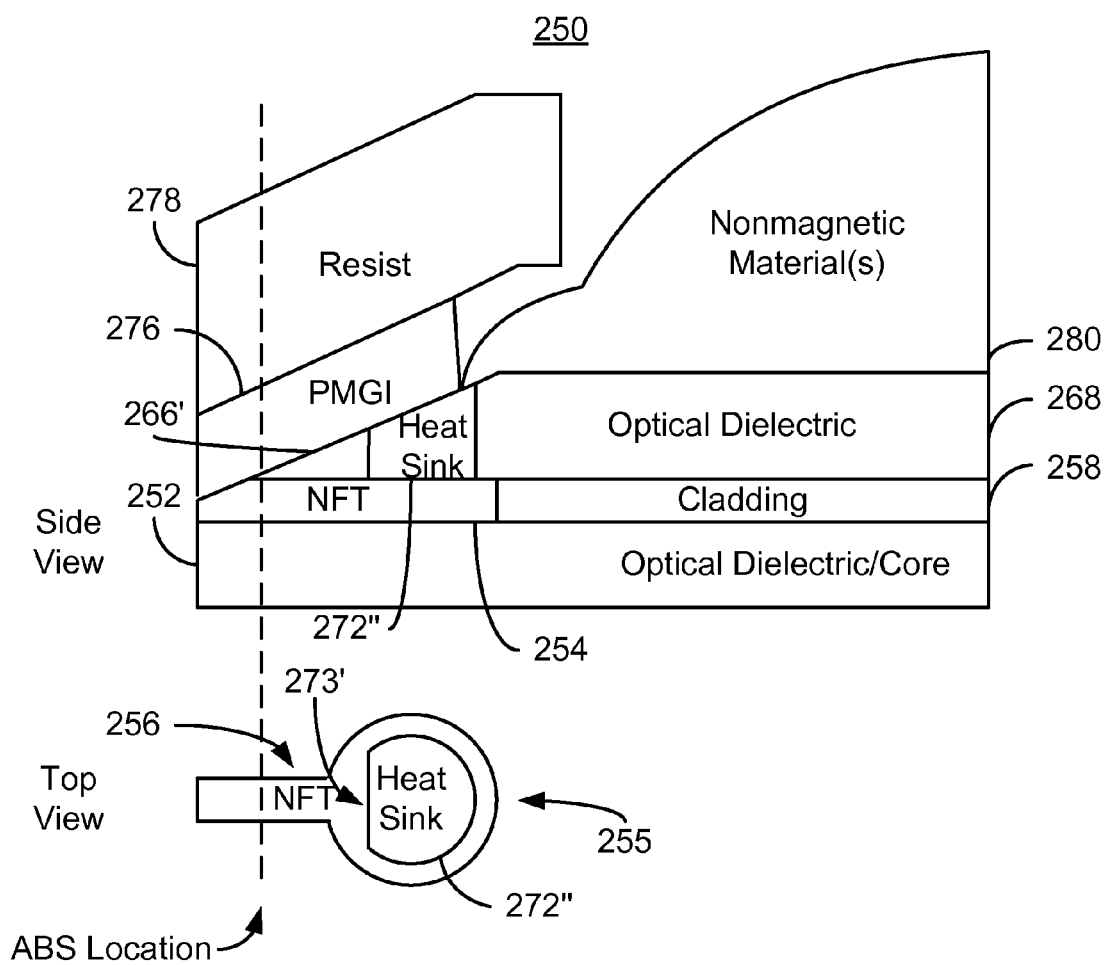

Mask layer(s) covering the heat sink 272" and a portion of the optical material(s) 268 are provided, via step 222. In some embodiments, a bilayer mask is provided in step 222. For example, a layer of PMGI and a layer of photoresist may be used. Nonmagnetic material(s) may then be deposited, via step 224. FIG. 14 depicts the EAMR transducer after step 224 is performed. Thus, mask layers 276 and 278 are shown. In the embodiment depicted, the mask layer 276 is PMGI, while the mask layer 278 is photoresist. The nonmagnetic material(s) 280 are thus sloped. Further, the nonmagnetic material(s) 280 may also be optical material(s). Consequently, the nonmagnetic material(s) 280 may also be used it thicken the top cladding 258.

The mask layer(s) 276 and 278 are then removed, via step 226. In some embodiments, a lift-off process is performed in step 226. However, in other embodiments other processes may be used. Some portion of the nonmagnetic material(s) may be removed. A remaining portion of the nonmagnetic material(s) 280 resides on at least the optical material(s) 268. The top surface of these materials 280 have top surface at a second angle with respect to the ABS. This second angle may be the same as the angle of the top surface 271 of the heat sink 272".

The remaining sacrificial mask 266' may optionally be removed, via step 228. The sacrificial mask 266' may be removed if the pole tip is desired to be in direct contact with the NFT 254.

Figure 15:
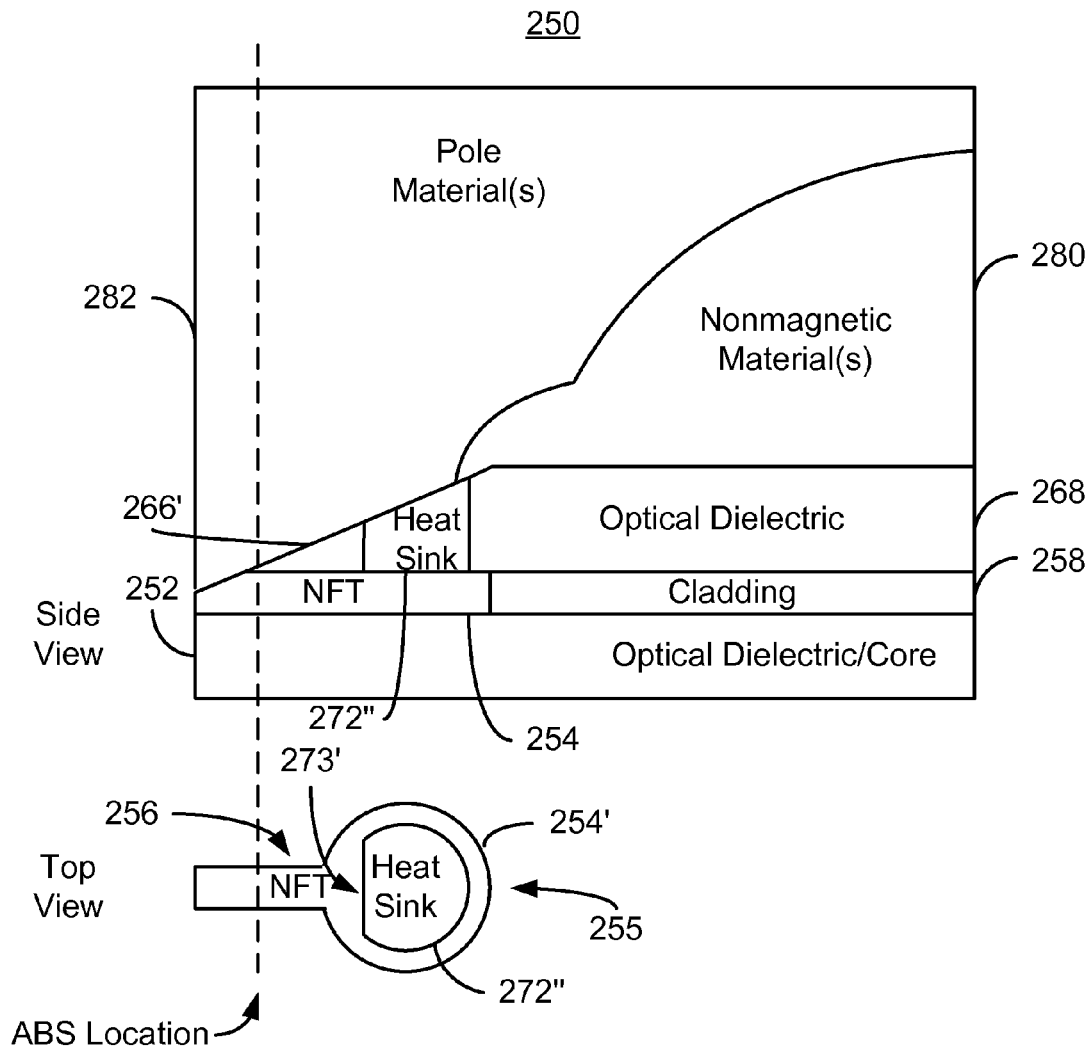
Figure 16:
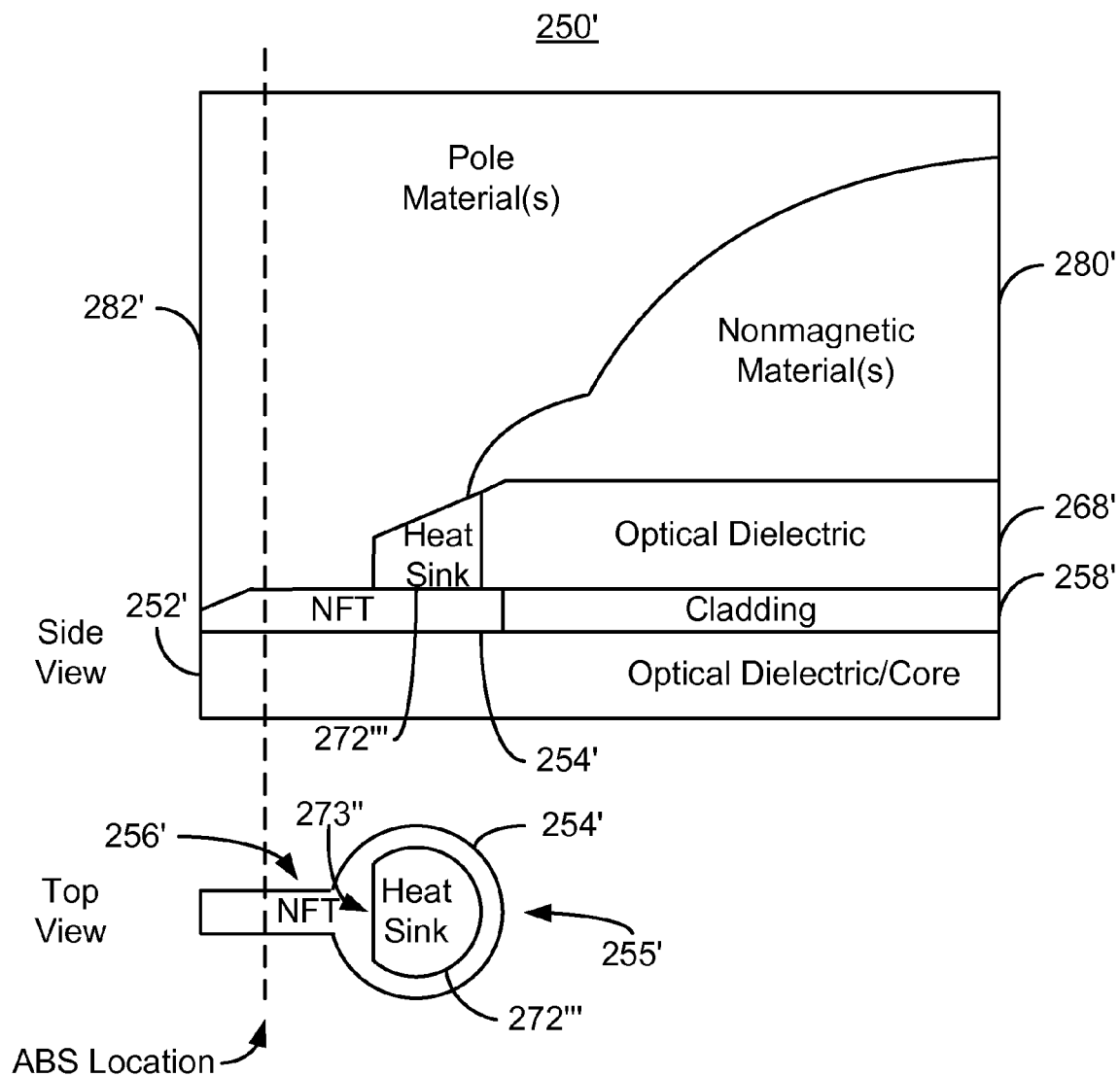

A write pole configured to write to a region of the media, is provided, via step 230. Step 230 includes depositing the high saturation magnetization pole materials and may include other steps. FIG. 15 depicts the EAMR transducer after deposition of the pole materials in step 230. In the embodiment shown in FIG. 15, the sacrificial mask 266' has not been removed. Thus, the pole tip would not have a flat portion in contact with the NFT 250. FIG. 16 depicts another embodiment of the EAMR transducer 250' after step 230 is performed. In this embodiments, the sacrificial mask 266' has been removed. Thus, the pole material(s) 282' and thus the pole would be in direct contact with the NFT 254'. Referring to FIGS. 15 and 16, the write pole 282/282' has a bottom surface, in contact with the heat sink 262"/272"' and nonmagnetic materials 280/280'. A portion of the bottom surface is thermally coupled with the top surface 271 (not labeled in FIGS. 15-16) of the heat sink 272". Coil(s) for energizing the write pole may be provided in step 232. Fabrication of the EAMR transducer may then be completed, via step 234.

Thus, using the method 200, the EAMR transducer 250 may be fabricated. The EAMR transducer has the desired geometry and heat dissipation. The method 200 and EAMR transducer 250 share the benefits of the method 100 and the EAMR transducer 150. Consequently, manufacturing and performance of the transducer 250 has been improved.

We claim:

1. A method for providing an energy assisted magnetic recording (EAMR) transducer coupled with a laser for providing energy and having an air-bearing surface (ABS) configured to reside in proximity to a media during use, the EAMR transducer including a near field transducer (NFT) proximate to the ABS for focusing the energy onto the region of the media, the method comprising:
   providing a sacrificial post on a first portion of the NFT distal from the ABS, the sacrificial post having a first edge proximate and substantially parallel to the ABS;
   providing a sacrificial mask on a second portion of the NFT between the sacrificial post and the ABS;
   providing at least one optical material adjacent to the sacrificial post, the sacrificial post residing between the at least one optical material and the ABS;
   removing the sacrificial post;
   providing a heat sink post corresponding to the sacrificial post, the heat sink post having a bottom and the first edge proximate and substantially parallel to the ABS, the bottom of the heat sink post being thermally coupled with the NFT;
   removing a portion of at least the heat sink post to provide a heat sink having a bottom thermally coupled with the NFT and a top surface at an angle with respect to the ABS, the angle being greater than zero and less than ninety degrees;
   providing at least one nonmagnetic material on at least the at least one optical material, the at least one nonmagnetic material having a top surface at a second angle with respect to the ABS,
   providing a write pole configured to write to a region of the media, the write pole having a bottom surface, a portion of the bottom surface thermally coupled with the top surface of the heat sink; and
   providing at least one coil for energizing the write pole.

2. The method of claim 1 wherein the first portion of the NFT has an NFT cross-sectional shape and wherein the step of providing the sacrificial post further includes:
   providing at least one sacrificial post material having a post cross-sectional shape substantially the same as the NFT cross-sectional shape;
   providing a resist mask covering at least a portion of the at least one sacrificial post material, the resist mask having a resist mask front edge corresponding to the first edge of the sacrificial post; and
   removing an exposed portion of the at least one sacrificial post material to provide the sacrificial post.

3. The method of claim 2 wherein the post cross-sectional shape is a disk.

4. The method of claim 3 wherein the post cross-sectional shape has a post diameter, the NFT cross-sectional shape has an NFT disk diameter, and wherein the post diameter is smaller than the NFT disk diameter.

5. The method of claim 2 further comprising:
   removing the resist mask after the sacrificial mask is provided.

6. The method of claim 1 wherein the step of removing the portion of the heat sink post further includes:
   providing a milling mask covering at least the at least one optical material; and
   ion milling the heat sink post at a milling angle corresponding to the angle.

7. The method of claim 1 wherein the step of providing the at least one nonmagnetic material further includes:
   providing at least one mask layer covering the heat sink;
   depositing the at least one nonmagnetic material; and
   removing the at least one mask layer.

8. The method of claim 1 further comprising:
   removing a remaining portion of the sacrificial mask after the at least one nonmagnetic material is provided and before the step of providing the write pole.

9. The method of claim 1 wherein the heat sink includes at least one Au and Cu.

10. The method of claim 1 wherein the at least one optical material includes aluminum oxide.

11. The method of claim 1 wherein the sacrificial post further includes at least one of SiC and amorphous carbon.

12. The method of claim 1 wherein the sacrificial mask includes at least one of NiFe, FeCr, Ru, Cr, and aluminum oxide.

13. The method of claim 1 wherein the step of providing the heat sink post further includes:
   depositing a heat sink layer; and
   planarizing the transducer.

14. A method for providing an energy assisted magnetic recording (EAMR) transducer coupled with a laser for providing energy and having an air-bearing surface (ABS) configured to reside in proximity to a media during use, the EAMR transducer including a near field transducer (NFT) proximate to the ABS for focusing the energy onto the region of the media, the NFT having an NFT cross-sectional shape, the method comprising:
   providing at least one sacrificial post material having a mask cross-sectional shape substantially the same as the NFT cross-sectional shape and residing on a first portion of the NFT;
   providing a resist mask covering at least a portion of the at least one sacrificial post material, the resist mask having a resist mask front edge;
   removing an exposed portion of the at least one sacrificial post material to provide a sacrificial post, the sacrificial post having a first edge corresponding to the front edge of the sacrificial post mask, the first edge being proximate and substantially parallel to the ABS;
   providing a sacrificial mask on a second portion of the NFT between the sacrificial post and the ABS;
   removing the resist mask after the sacrificial mask is provided;
   providing at least one optical material adjacent to the sacrificial post, the sacrificial post residing between the at least one optical material and the ABS;
   removing the sacrificial post;
   providing a heat sink post corresponding to the sacrificial post, the heat sink post having a bottom and the first edge proximate and substantially parallel to the ABS, the bottom of the heat sink post being thermally coupled with the NFT;
   providing a mask covering at least a portion of the at least one optical material;
   ion milling a portion of at least the heat sink post at a milling angle to provide a heat sink having a bottom thermally coupled with the NFT and a top surface at an angle with respect to the ABS, the angle being greater than zero, less than ninety degrees, and corresponding to the milling angle;
   providing at least one mask layer covering the heat sink and a portion of the at least one optical material;
   depositing at least one nonmagnetic material;
   removing the at least one mask layer, a remaining portion of the at least one nonmagnetic material residing on at least the at least one optical material and having a top surface at a second angle with respect to the ABS,
   providing a write pole configured to write to a region of the media, the write pole having a bottom surface, a portion of the bottom surface thermally coupled with the top surface of the heat sink; and
   providing at least one coil for energizing the write pole.

15. The method of claim 14 further comprising:
   removing a remaining portion of the sacrificial mask after the at least one nonmagnetic material is provided and before the step of providing the write pole.

* * * * *